United States Patent [19]

Koshimo

[11] Patent Number: 4,572,339

[45] Date of Patent: Feb. 25, 1986

[54] LOCK-UP CLUTCH OF A TORQUE CONVERTER

[75] Inventor: Masahiko Koshimo, Osaka, Japan

[73] Assignee: Kabushiki Kaisha Daikin Seisakusho, Osaka, Japan

[21] Appl. No.: 535,965

[22] Filed: Sep. 23, 1983

[30] Foreign Application Priority Data

Sep. 28, 1982 [JP] Japan .................................. 57-170463

[51] Int. Cl.⁴ ........................ F16D 3/66; F16D 13/68; F16D 33/00
[52] U.S. Cl. .............................. 192/3.31; 192/106.2; 464/68
[58] Field of Search ...................... 192/3.28, 3.29, 3.3, 192/3.31, 70.17, 106.1, 106.2; 464/68

[56] References Cited

U.S. PATENT DOCUMENTS

| | | | |
|---|---|---|---|
| 4,049,093 | 9/1977 | Vukovich et al. | 192/3.3 |
| 4,304,107 | 12/1981 | Fall et al. | 192/106.2 X |
| 4,360,352 | 11/1982 | Lamarche | 464/68 X |
| 4,386,687 | 6/1983 | Chevalier et al. | 192/3.31 X |
| 4,413,711 | 11/1983 | Lamarche | 192/3.28 |
| 4,427,400 | 1/1984 | Lamarche | 464/68 X |
| 4,493,674 | 1/1985 | Tamura et al. | 192/106.2 X |

*Primary Examiner*—Allan D. Herrmann
*Attorney, Agent, or Firm*—Armstrong, Nikaido, Marmelstein & Kubovcik

[57] ABSTRACT

The present invention discloses a lock-up clutch of a torque converter comprising a disc hub adapted to be connected slidably only in an axial direction to a turbine hub of a torque converter and having a radial flange, a pair of annular side plates disposed at both sides of the hub flange, torsion spring mechanisms disposed in openings and hollows in the hub flange and the side plates for connecting the side plates to the hub flange, each torsion spring mechanism having plural elastic members aligned in the disc circumferential direction in series with floating spacers therebetween, a friction portion provided on a radially outer portion of the side plate and adapted to be axially pressed to an inner surface of a front cover of the torque converter, and a forcing means for forcing and pressing the friction portion to the front cover.

4 Claims, 5 Drawing Figures

LOCK-UP CLUTCH OF A TORQUE CONVERTER

BACKGROUND OF THE INVENTION

The present invention relates to a lock-up clutch provided in a torque converter for automobiles or the like.

Generally, a lock-up clutch of a torque converter is designed to directly connect an input portion and an output portion of the torque converter together when the speed ratio of the input and output portions is nearly 1:1. By the use of the lock-up clutch, torque transmission efficiency of the torque converter can be increased. However, in the conventional lock-up clutch, a piston-clutch plate connectable to the input portion of the torque converter and a damper disc connected to the output shaft are separately disposed. The clutch plate and the disc are axially aligned and are designed to be connected together. Therefore, the lock-up clutch has a large axial size, which undesirably increases the size of the torque converter.

Accordingly, it is an object of the invention to provide an improved lock-up clutch, overcoming the above disadvantage.

The essence of the present invention is to provide a lock-up clutch, wherein a side plate itself of a damper disc is adapted to be pressed to an input portion of a torque converter.

Other and further objects, features and advantages of the invention will appear more fully from the following description of the preferred embodiments of the invention.

DETAILED DESCRIPTION OF THE PREFERRED EMBODIMENTS

Figure 1:
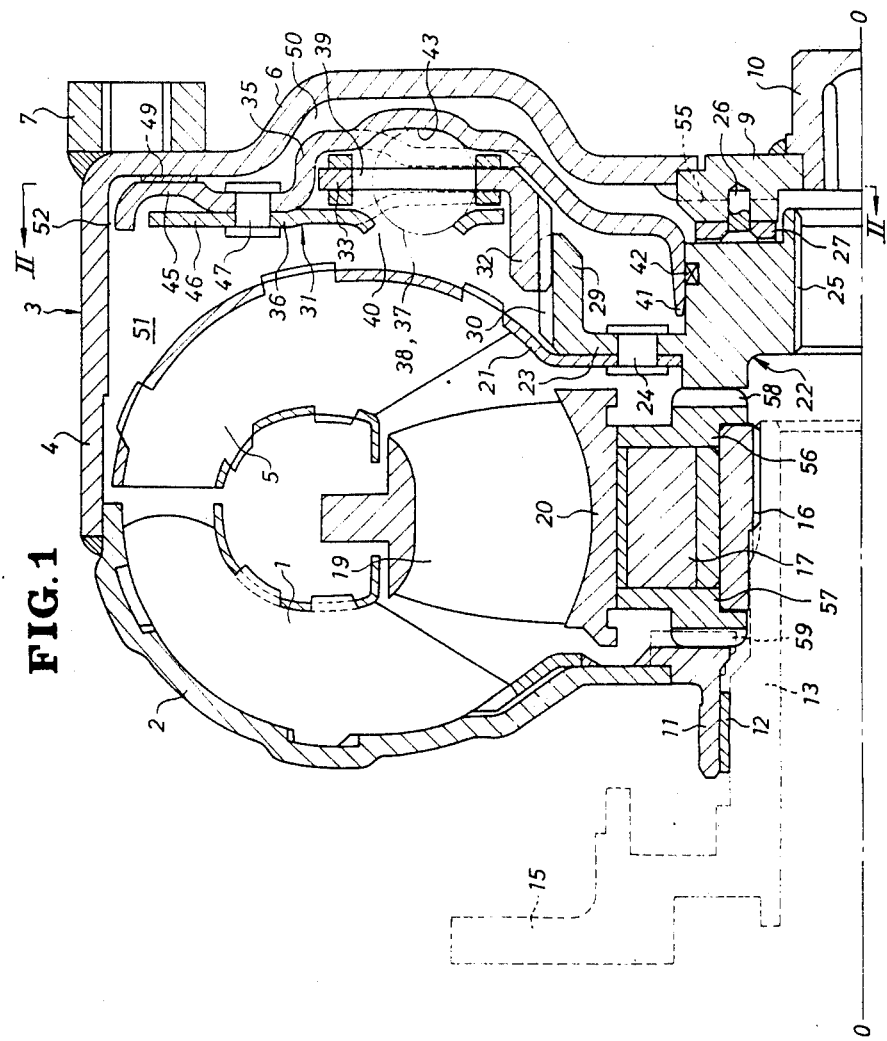
FIG. 1 is a sectional partial view of a torque converter including a lock-up clutch according to the invention.

Referring to FIG. 1, a pump impeller 1 of a torque converter has a shell 2, of which outer end portion is welded to an end portion of a cylindrical outer wall 4 of a front cover 3. The cover 3 has an annular end wall 6 which covers a rear side (opposite side to the impeller 1) of a turbine 5. Plural nut-like bosses 7 are welded to radially outer portions of the end wall 6. The bosses 7 are fixed to a flywheel (not shown) of an engine by bolts. An annular boss 9 is welded to the inner periphery of the end wall 6. A guide shaft 10 is welded to the inner periphery of the boss 9. The inner periphery of the impeller shell 2 is welded to an annular hub 11, of which cylindrical portion is supported by the outer peripheral surface of the stationary shaft 13 through a bush 12. The left end in FIG. 1, the stationary shaft 13 is provided with a radial outward flange 15 which is fixed to a transmission case (not shown) or the like. The shaft 13 is provided at its other end with spline teeth to which a cylindrical boss 16 is splined. The outer peripheral surface of the boss 16 supports a shell 20 or a boss of a stator 19 through an one-way clutch 17.

An annular flange 23 is fixed by rivets 24 to an inner peripheral portion of a shell 21 of the turbine 5. The flange 23 is provided at the outer periphery of a turbine hub 22. The hub 22 is splined at its inner spline teeth 25 to an end of an output shaft (not shown). The center of the output shaft is indicated by a line 0-0. The other end of the output shaft is connected to an input portion of the transmission. A thrust washer 27 is disposed between the boss 22 and said boss 9 and is fixed by a pin 26 to the boss 9. A cylindrical portion 29 coaxial with the output shaft center 0-0 is projected from the outer peripheral portion of the flange 23 toward the end wall 6. The cylindrical portion 29 is provided at its outer periphery with spline teeth 30, to which a cylindrical hub 32 of a clutch disc 31 is splined slidably only in the axial direction.

In the disc 31, a pair of annular plates 35 and 36 are disposed at both sides of a radial flange 33 of the hub 32. The flange 33 and the plates 35 and 36 are connected through torsion springs 37 and 38. The structure of the disc 31 will be described more in detail hereinafter.

The flange 33 projects radially outwardly from the end portion of the hub 32 near the end wall 6. The flange 33 is provided at its radially middle portions with openings 39 in which the torsion springs 37 and 38 are disposed. The side plate 36 is disposed between the flange 33 and the turbine shell 21, and is provided with openings 40 axially registered with the openings 39. Other side plate 35 is disposed between the flange 33 and the end wall 6, and is provided with hollows 43 axially registered with the openings 39. The plate 35 is provided at its inner periphery with a cylindrical portion 41 which rotatably fits in sealed condition with a seal ring 42 disposed in an outer peripheral groove of the turbine boss 22. The outer peripheral portions 45 and 46 of the plates 35 and 36 extend radially outwardly beyond the flange 33 and are fixed closely together by rivets 47. At the radially outer portion with respect to the rivets 47, an annular friction plate 49 or facing which faces to the wall 6 is fixed to the outer peripheral portion 45 of the plate 35.

Hydraulic chamber 50 and 51 are formed at both sides of the side plate 35. A space 52 is formed between the plate 35 and the outer wall 4 of the front cover. The side plate 35 is not provided with an aperture or a recess through which both chambers 50 and 51 are connected, so that the plate 35 forms a piston which is operable to axially shift by a difference of the pressures in the chambers 50 and 51. The friction plate 49 closes the space 52 with respect to the chamber 50 when it is pressed to the end wall 6 as shown in FIG. 1. The boss 9 at the inner periphery of the wall 6 is provided with an oil passage 55 connected to the chamber 50. The passage 55 is also connected to a hydraulic source (not shown) through another passage and a control valve (not shown). Annular members 56 and 57 are disposed at both sides of the one-way clutch and are provided with oil passages 58 and 59 connected to the chamber 51. The passages 58 and 59 are also connected to the hydraulic source through another passage and a control valve (not shown). One or both of the passages 58 and 59 may be eliminated. Instead of the passages 58 and 59, the passage 55 may be eliminated. The above control valves are connected to a hydraulic pressure controlling device having a sensor detecting an opening degree of an accelator device and other sensors. The hydraulic pressure controlling device is operable to adjust the opening degrees of the control valves to relatively change the pressures in the chambers 50 and 51, so that the pressure in the chamber 51 may be relatively increased when the ratio of the rotation speed of the impeller 1 to that of the turbine 5 approaches to a value of 1:1.

Figure 2:
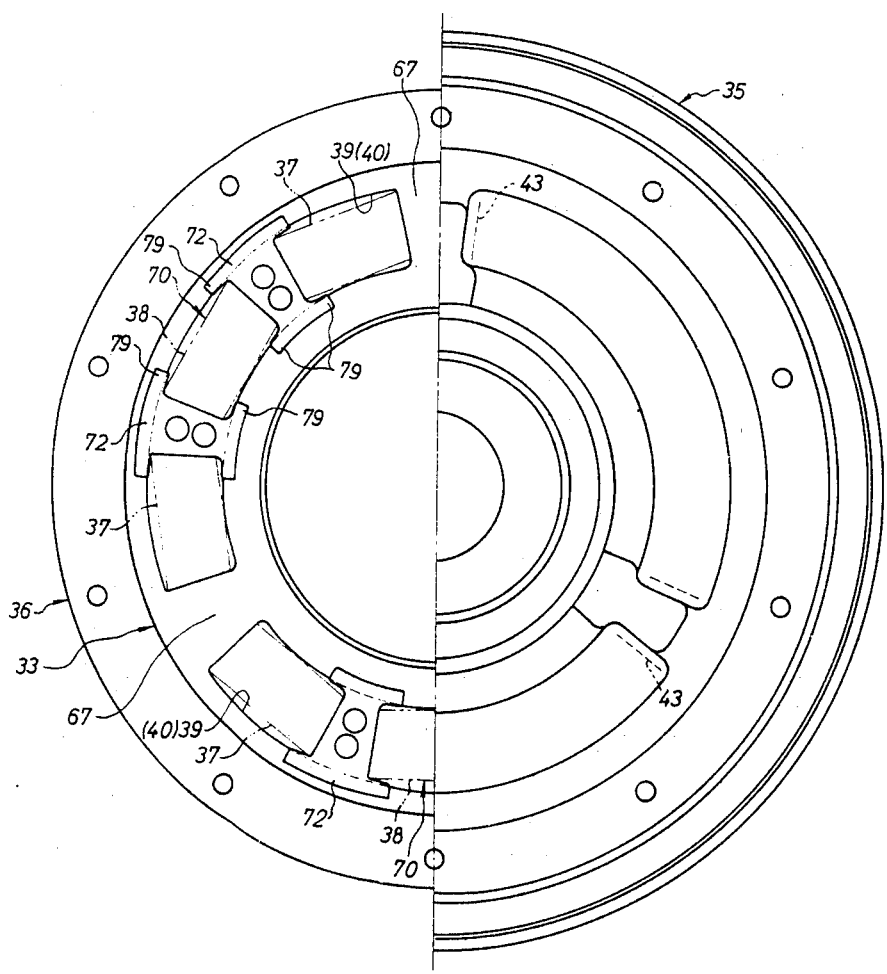
FIG. 2 is a partially cut-away view of the lock-up clutch taken in the direction of the arrow II—II in FIG. 1.

Referring to FIG. 2, the flange 33 is provided with three radial arms 67 with circumferentially equal space therebetween. Said openings 39 are three in number and are formed between the arms 67. The openings 40 of said plate 36 and the hollows 43 of the plate 35 have the same circumferential length as the openings 39, respectively. The openings 40 and the hollows 43 are three in number, respectively. One torsion spring mechanism 70 having two springs 37 and one spring 38 is disposed in each set of the openings 39 and 40 and the hollow 43. In each spring mechanism 70, the springs 37 and 38 are aligned in the circumferential direction of the disc, and floating spacers 72 are disposed between the springs 37 and 38. The spring 38 is disposed between the springs 37. In the illustrated condition in which the side plates 35 and 36 do not torsionally turn or twist with respect to the flange 33, both ends of the spring mechanism 70 are in contact with the side edges of the opening 39 and 40 and the end surfaces of the hollow 43.

Figure 4:
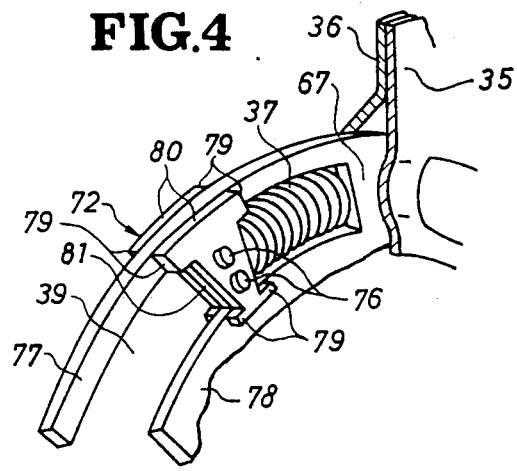
FIG. 4 is a partial perspective view of a spring mechanism.
Figure 5:
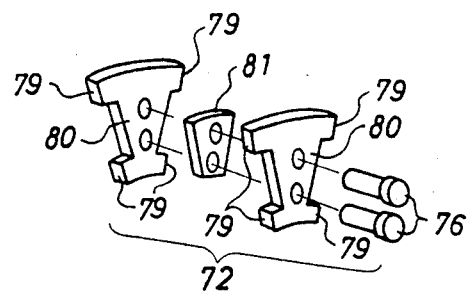
FIG. 5 is a perspective view of a floating spacer means in a disassembled condition.

Referring to FIGS. 4 and 5, each floating spacer 72 comprises a pair of H-shaped end plates 80 and a slider 81 disposed between the plates 80 and fixed thereto by rivets 76. The radial length of the slider 81 is shorter than those of the plate 80, and thus, grooves are formed on the inner and outer peripheries of the slider 81. These grooves engage with rail portions 77 and 78 surrounding the outer and inner peripheries of the opening 39, respectively. By these engagements, each floating spacer 72 can smoothly slide in the disc circumferential direction without play when the springs are compressed, as will be detailed later. Each end plate 80 is provided at its radially outer and inner ends with stoppers 79 which projects in disc circumferential direction (both directions).

One of the specific functions or operations of the disc can be as follows. In FIG. 1, when the pressure in the chamber 51 is relatively increased by said hydraulic pressure controlling device to force the side plate 35 toward the end wall 6, the whole disc 31 moves on the spline teeth 30 toward the end wall 6, so that the friction plate 49 is pressed to the end wall 6. Thus, the front cover 3 is connected to the turbine hub 22 through the disc 31, i.e., the lock-up clutch is engaged, and the torque from the flywheel is transmitted to the output shaft through the wall 6, the friction plate 49, the side plates 35 and 36, the torsion springs 37 and 38, the flange 33, the hub 32 and the hub 22.

Figure 3:
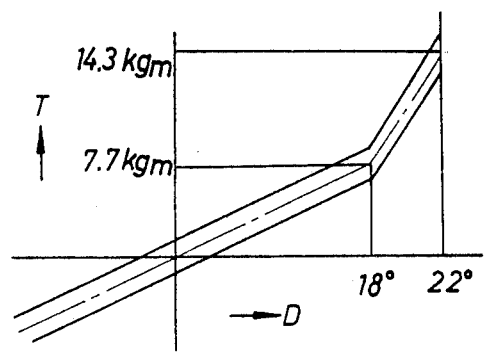
FIG. 3 is a graph showing a transmitted torque-torsion angle characteristic.

In this operation, the springs 37 and 38 are compressed by a force corresponding to the transmitted torque, so that the plates 35 and 36 torsionally turn with respect to the flange 33. Before the torsion angle D (see FIG. 3) reaches a value of 18°, all of the springs 37 and 38 in each spring mechanism 70 are compressed, so that an increasing rate of the torsion angle D with respect to the transmitted torque T is large as shown in FIG. 3. When the torsion angle D increases over the value of 18°, the spacers 72 disposed at both sides of each spring 38 contact with each other at their stoppers 79, so that the springs 38 are not compressed, and only the springs 37 are compressed. Therefore, the increasing rate of the torsion angle D with respect to the transmitted torque T is small. When the torsion angle D increases to a value of 22°, all of the springs 37 are fully compressed, so that the disc is prevented from further torsioning.

When the hydraulic pressure controlling device relatively decreases the pressure in the chamber 51, the side plate 35 is pushed back by the pressure in the chamber 50, so that the whole disc 31 moves toward the turbine 5. Thus, the friction plate 49 moves away from the end wall 6, and the clutch is released. In this condition, the power of the engine is transmitted from the impeller 1 to the turbine 5 through the working oil.

According to the invention, as stated hereinbefore, the clutch includes the following structure. Namely, The disc hub 32 is connected slidably only in the axial direction to the turbine hub 22. The radial hub flange 33 of the disc hub 32 is connected through the torsion spring mechanism 70 to the annular side plates 35 and 36 disposed at both sides of the flange 33. The friction plate 49 adapted to be axially pressed to the inner surface of the front cover 3 is provided on the surface of the radially outer portion of the side plate 35. The clutch is also provided with forcing means (the hydraulic chambers 50 and 51, the control valve and others) operable to press the friction plate 49 to the front cover 3. As apparent from the above, the side plate 35 of the disc 31 also functions as the piston-clutch plate to be pressed to the front cover 3. Therefore, a conventional piston-clutch plate which functions only as the piston-clutch plate is not necessary to be disposed between the side plate 35 and the wall 6. This results in such advantages that the axial size of the lock-up clutch can be short, and that the lock-up clutch can easily be assembled in a narrow space in the torque converter. Further, since the number of the parts is small, the assembling process can be simple, which also makes it easy to assemble the clutch in the torque converter. Furthermore, since the spring mechanisms 70 disposed in the openings 39 and 40 and the hollows 43 comprise plural springs 37 and 38 which are circumferentially aligned in series, respectively, the maximum torsion angle can be large, so that the absorbing effect for the torque vibration can be increased sufficiently.

In the illustrated embodiment, since the floating spacers 72 are supported and guided by the rail portions 77 and 78 of the hub flange 33, it is not necessary to provide members used only for guiding the spacers 72, which also simplifies the structures.

In a modification of the invention, elastic members made of rubber may be substituted for one, some or all of the springs 37 and 38.

Although the invention has been described in its preferred form with a certain degree of particularity, it is understood that the present disclosure of the preferred form may be changed in the details of construction and the combination and arrangement of parts may be resorted to without departing from the spirit and scope of the invention as hereinafter claimed.

What is claimed:

1. A lock-up clutch, for a torque converter including a turbine enclosed in a cylindrical cover having an annular end wall, said clutch comprising:

a disc hub axially slidably connected to a hub of said turbine for rotation therewith and having a radial hub flange with circumferentially extending openings formed therein;

a clutch disc comprising a first annular side plate slidably mounted for axial and radial movement on said turbine hub within said torque converter cover adjacent said end wall and having an annularly hollowed portion, a second annular side plate attached to said first side plate near the outer periphery thereof and having an inwardly extending portion substantially parallel to and spaced from said annularly hollowed portion of said first side plate, said disc radial hub flange extending radially outwardly between said spaced side plate portions;

torsion spring mechanisms consisting of plural elastic members disposed in series in said circumferentially extending hub flange openings and floating spacers between adjacent pair of said elastic members, said torsion spring mechanisms being laterally retained in said openings by said spaced portions of said side plates;

friction means fixed on a radially outer portion of said first side plate and adapted to be axially pressed against an inner surface of said end wall; and forcing means adapted to urge said clutch disc axially to press said friction means against said inner surface of said end wall.

2. A lock-up clutch as recited in claim 1 wherein said friction means is operable to press against said front cover in a hydraulically sealed condition, said first side plate carrying said friction means is provided with an inner periphery which is slidably connected to said turbine hub in a hydraulically sealed condition, and said forcing means constitutes a hydraulic chamber formed by said first side plate and said cover and includes an oil passage for connection to a hydraulic pressure source through a control valve.

3. A lock-up clutch as recited in clam 1 wherein said torsion spring mechanisms have a torsion characteristic in which torque increases during the torsion operation.

4. A lock-up clutch as recited in claim 2 wherein said first side plate constitutes a solid member forming a wall of said hydraulic chamber, said second side plate has circumferentially extending openings formed therein axially registered with said circumferentially extending openings of said radial hub flange, and said spring mechanisms are positioned between said annularly hollowed portion of said first side plate and said openings formed in said second side plate.

* * * * *